Figure 1:
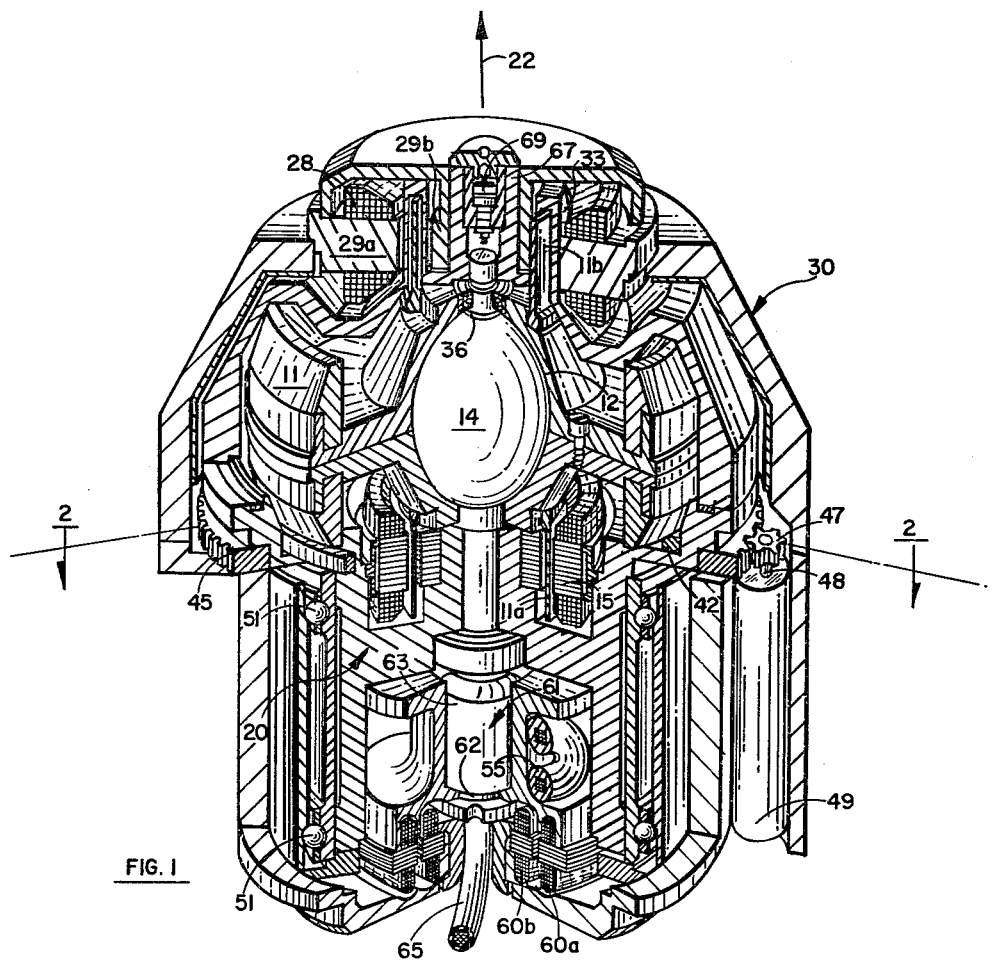

Nov. 2, 1965   S. W. COGAN   3,214,981
CASE ROTATED GYROSCOPE

Filed July 2, 1962   2 Sheets-Sheet 1

INVENTOR.
STANLEY W. COGAN

BY
ATTORNEY

United States Patent Office 3,214,981
Patented Nov. 2, 1965

3,214,981
CASE ROTATED GYROSCOPE
Stanley W. Cogan, Whittier, Calif., assignor to
North American Aviation, Inc.
Filed July 2, 1962, Ser. No. 207,465
8 Claims. (Cl. 74—5.4)

This invention relates to a case rotated gyroscope and more particularly to a gyroscope in which an inner case portion is rotated about the rotor spin axis at a comparatively low speed to minimize the drift effects of error torques acting normal to the rotor spin axis.

A free-rotor gyroscope can be utilized to produce outputs useful for platform stabilization about two mutually orthogonal axes which are normal to the rotor spin axis. Such a gyroscope having sufficient accuracy for use in an inertial navigation system is described in co-pending patent application entitled Free-Rotor Gyroscope, Donal B. Duncan et al., Serial No. 641,720, filed February 21, 1957, and assigned to North American Aviation, Inc., the assignee of this application. The aforementioned patent application Serial No. 641,720 describes a gyroscope having a rotor supported on a gas bearing formed between case member surfaces and surfaces of the rotor which is similar in general configuration to the gyroscope described herein. While the gyroscope described in the Duncan et al. application has very high accuracy, certain drift errors have been found to arise due to factors tending to produce torque components normal to the rotor spin axis such as asymmetries in the motor drive and/or the spin bearing. While in a precision fabricated instrument, such error torques may be of a relatively small magnitude, they still are great enough to detract from the high precision accuracy demanded of the gyroscope when it is used in an inertial navigation system.

The device of this invention provides means for minimizing gyroscope drift due to such error torque producing factors. This end result is achieved by providing an inner gyroscope case which is rotated about the rotor spin axis at a relatively low speed as compared with the speed of rotor rotation to average out the effects of case associated error torques with each revolution of the case. This inner case is substantially surrounded by a fixed outer case. The inner case completely surrounds the rotor structure to provide a fluid tight seal around the rotor, thereby enabling the containment of gas for the rotor spin bearing and pressurization of this bearing. The rotor drive means is mounted on the rotatable inner case and rotates therewith. The gyroscope torquer is mounted on the fixed outer case. As the gyroscope pickoff means is mounted on the rotatable inner case, pickoff resolver means are provided to eliminate the effects of rotation of the pickoff means, thereby assuring proper sensing of the pickoff means output.

It is therefore an object of this invention to provide an improved free-rotor gyroscope.

It is a further object of this invention to minimize the effects of error torques in a free-rotor gyroscope.

It is a still further object of this invention to improve the accuracy of a free-rotor gyroscope.

It is a still further object of this invention to average out certain error torques in a free-rotor gyroscope by rotating the case member about the rotor spin axis.

Figure 2:
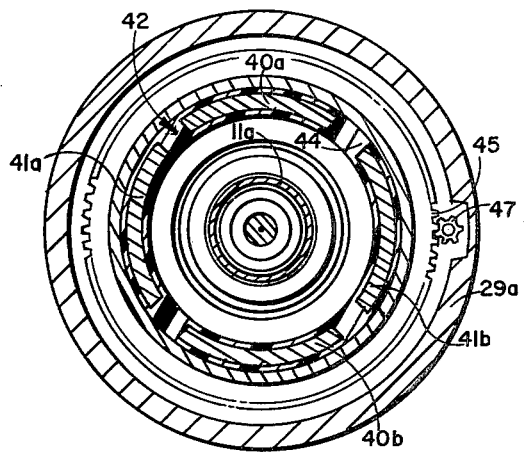
Figure 3:
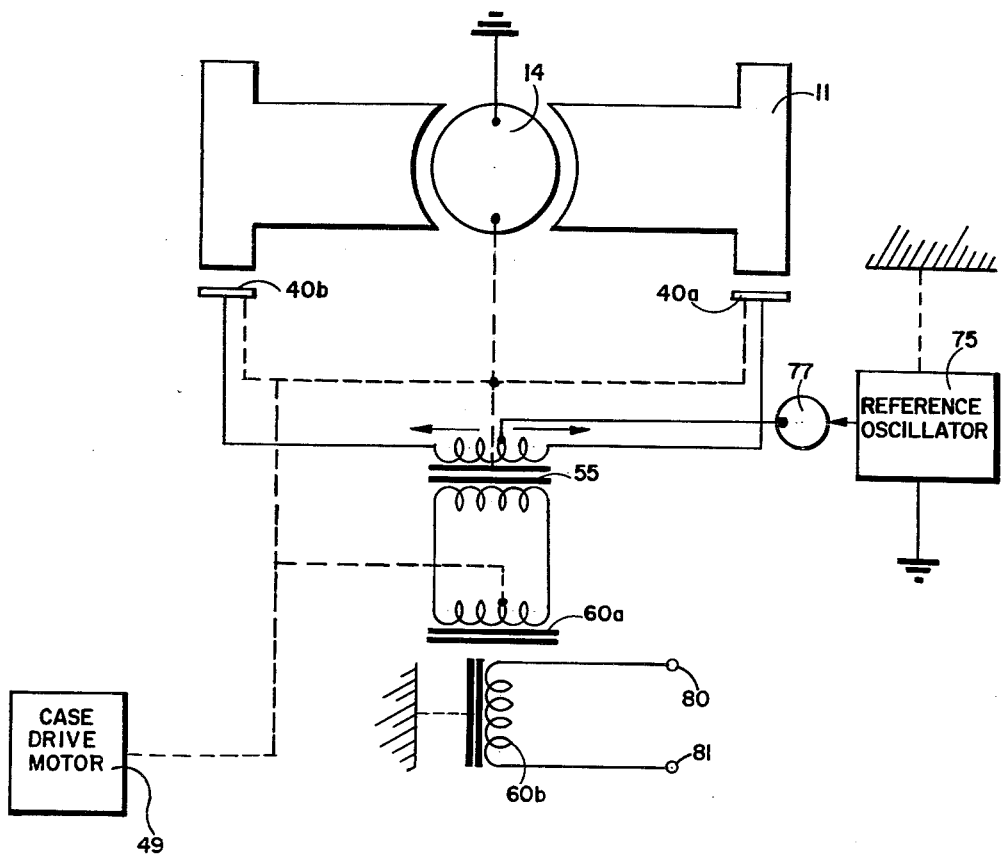

Other objects of this invention will become apparent from the following description taken in connection with the accompanying drawings of which FIG. 1 is a perspective view with cutaway section of a preferred embodiment of the device of the invention;

FIG. 2 is a cross-sectional view of the embodiment of FIG. 1 taken along the plane as indicated by line 2—2 in FIG. 1;

And, FIG. 3 is a schematic diagram indicating pickoff circuitry which may be utilized in the device of the invention.

Referring now to FIGS. 1 and 2, illustrating a preferred embodiment of the device of the invention, a rotor 11 is supported for three degrees of freedom on a gas bearing 12 formed between the spherical member 14 and the surfaces of the rotor complementary thereto. Rotor 11 has a highly conductive cylindrical motor sleeve member 11a which extends therefrom. Motor 15 is mounted on the inner case 20 and is excited by an A.-C. power source (not shown). Motor 15 generates eddy currents in cylindrical sleeve 11a and a force is produced by the inter-action between the field produced by motor 15 and these eddy currents to drive rotor 11 about spin axis 22 on gas bearing 12. The upper portion of the rotor has a cylindrical torquer sleeve 11b thereon. A torquer coil 28 and its associated core portions 29a and 29b are fixedly attached to outer case 30, core portions 29a and 29b being positioned on opposite sides of sleeve 11b. The torquer coil 28 is suitably excited by a predetermined torquing current and when the rotor is rotated, eddy currents are generated in torquer sleeve 11b within septum 33 which runs along the walls of sleeve 11b and forms part of inner case 20. This torquer device is utilized to provide predetermined torquing on the gyroscope rotor to compensate for various predicted errors.

A rotatable stable stop member 36 is provided to limit motion of the rotor about axes normal to the spin axis. Pickoff plate assembly 42 having pairs of conductive pickoff plates 41a, 41b and 40a, 40b insulated from each other by insulating support portion 44 (see FIG. 2) are utilized to provide a pickoff signal sensing relative motion between the rotor and the inner case about a pair of mutually orthogonal axes passing through the rotor spin axis and normal thereto. Except for the inner and outer case structure, the gyroscope as described thus far is similar in construction and operates in the same general fashion as the gyroscope shown in FIG. 1 of aforementioned patent application Serial No. 641,720.

Inner case 20 has a drive gear 45 running around the outer periphery thereof. This drive gear engages pinion gear 47 which is connected to the output shaft 48 of motor 49. Motor 49 is fixedly attached to outer case 30 and is suitably driven by a power source (not shown) to provide a slow speed rotation of inner case 20 about the rotor spin axis 22 on roller bearings 51 located between the inner and outer cases. In an operative embodiment of the device of the invention, rotation of the inner case at a speed of about 10 r.p.m. has been found to be most satisfactory. A separate pickoff transformer 55 is connected to each pair of pickoff plates 40a, 40b and 41a, 41b. The output of each pickoff transformer 55 is connected to a separate pickoff resolver winding 60a which is attached to the inner case 20. The signals from each pickoff resolver winding 60a are inductively coupled to a separate resolver winding 60b which is attached to the outer case 30. The pickoff resolver windings 60a and 60b appropriately eliminate the effects of the inner case rotation on the sense of the pickoff signals appearing between pickoff plates 40a, 40b and 41a, 41b. The operation of the resolver and the pickoff circuitry will be explained further on in the specification in connection with FIG. 3.

A slip-ring assembly 61 has an outer portion 63 attached to inner case 20 and an inner portion 62 concentric with portion 63 attached to outer case 30. The slip-ring assembly provides electrical connections from cable 65 to the inner case mounted rotor drive motor 15 and to the pickoff assembly 42.

The rotatable inner case includes spherical support member 14 as well as the structure which completely surrounds rotor 11 including the septum 33. Septum 33 is of a non-magnetic material which will not interfere with the torquing action on torquer sleeve 11b by the torquer unit. The top portion 67 of the inner case has an intake valve 69 mounted therein to permit the introduction of gas for the rotor support bearing into the sealed compartment formed by the inner case.

By rotating the inner case 20 about the rotor spin axis 22, the case fixed error torques are averaged out over a finite number of revolutions. The averaging effect will result in a gyro with low random drift, low temperature and motor voltage sensitivity, and good bias repeatability. As already noted, the largest source of error torque thus compensated for is that related to the rotor drive motor due to microscopic creep of the motor elements either with normal aging or temperature changes or as a function of spin motor voltage changes where these motor changes are of a nature to produce error torques normal to the rotor spin axis. The torques which are compensated for may also include other types such as, for example, those due to asymmetry in the rotor spin bearing.

Referring now to FIG. 3, a schematic diagram illustrating the pickoff circuitry which may be utilized in the device of the invention is shown. For the purposes of explanation, only one pair of pickoff plates and its associated circuitry is illustrated. The other pair of plates will have a similar associated circuit. A.-C. reference signals are fed from reference oscillator 75 through slipring 77 to the center tap of the primary of pickoff transformer 55. The output signal from reference oscillator 75 may have a frequency in the neighborhood of 5,000 cycles. When pickoff plate 40a is closer to rotor 11 than pickoff plate 40b, greater current will flow from the center tap in the half of the transformer primary winding associated with pickoff plate 40a. There, therefore, will be a net current flow having one particular phase relationship with the output signal from reference oscillator 75. On the other hand, when pickoff plate 40b is closer to rotor 11 than pickoff plate 40a, a greater current flow in this half of the transformer winding results in opposite polarity signals at any instance from that appearing when 40a is closer and a net current flow results the secondary of transformer 55 having a phase relationship with the output of reference oscillator 75 which is opposite to that when plate 40a is closer. When both plates 40a and 40b are equidistant from rotor 11, equal and opposite current flows in the primary of transformer 55 produce no net flux change and hence no signal is coupled into the secondary of this transformer.

The signal in the secondary of transformer 55 is fed to pickoff resolver winding 60a. Resolver winding 60a, as well as transformer 55, pickoff plates 40a and 40b are all mounted on the inner case which is rotatably driven by case drive motor 49. The secondary winding 60b of the pickoff resolver is attached to the outer case. Primary winding 60a therefore rotates with the inner case relative to secondary winding 60b and this produces in winding 60b a signal having an amplitude and a phase relationship with the signal in 60a which varies in accordance with this relative rotation.

The signal from resolver winding 60b is fed from output terminals 80 and 81 to an appropriate phase sensitive demodulator (not shown) in which signals in accordance with relative motion between rotor 11 and the outer gyro case 30 about mutually orthogonal axes running through and normal to the rotor spin axis are produced. The pickoff circuitry shown in FIG. 3 is similar to that described in the aforementioned co-pending application Serial No. 641,720 with the exception of the circuitry associated with the rotated case member including the pickoff resolver utilized to eliminate the effects of this rotation on the sensed pickoff output signals.

The torquer structure of the device of the invention is fixedly mounted on the outer case of the gyro. Such fixed mounting of the torquer structure is necessary in view of its precise axis alinement requirements. To resolve the rotating signal produced to the required accuracy were the torquer to be rotated would be extremely difficult. For this reason it has been found to be highly desirable to maintain the torquerer structure fixed with respect to the outer case. In attaining this end result and at the same time providing a sealed inner case, septum structure 33 (see FIG. 1) which completely surrounds torquer sleeve 11b and circumvents the torquer core pieces 29a and 29b has been provided.

The device of this invention thus provides a simple yet highly effective means for improving the accuracy of a free-rotor gyroscope by averaging out error torques with each revolution of an inner case structure.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A case rotated gyroscope comprising,
    an outer case,
    an inner case rotatably mounted on said outer case,
    a rotor supported in said inner case for three degrees of freedom relative thereto,
    drive means mounted on said inner case for rotatably driving said rotor about a spin axis,
    drive means mounted on said outer case for rotatably driving said inner case about said rotor spin axis at a low speed, as compared with the rotation speed of said rotor,
    said inner case surrounding said rotor and forming a fluid tight seal between said rotor and said outer case, and
    means mounted on said outer case for torquing said rotor.
2. The device as recited in claim 1 wherein said rotor has a cylindrical torquer sleeve portion,
    said torquing means including a torquer coil and a torquer core portion positioned on opposite sides of said sleeve portion,
    said inner case having a portion thereof running along the walls of said sleeve portion to form a septum between said sleeve portion and said torquing means.
3. In a case rotated gyroscope,
    an inner case,
    a rotor,
    bearing means for rotatably supporting said rotor on said inner case,
    motor means attached to said inner case for rotatably driving said rotor about a spin axis,
    an outer case,
    said inner case being rotatably mounted on said outer case,
    means for rotatably driving said inner case relative to said outer case about said rotor spin axis at a slow speed as compared with rotor rotation,
    and means fixedly mounted on said outer case for torquing said rotor,
    said inner case completely surrounding said rotor to form a fluid tight compartment therefor.
4. The device as recited in claim 3 wherein said rotor has a cylindrical torquer sleeve, and
    said torquing means includes a torquer portion mounted on one side of said sleeve and a torquer portion mounted on the other side of said sleeve,
    said inner case having a septum portion thereof following the walls of said torquer sleeve and running between said sleeve and said torquer portions.
5. In a case rotated gyroscope,
    an inner case, a rotor mounted for three degrees of freedom relative to said inner case,
a fluid bearing formed between opposing surfaces of said rotor and said inner case,
said rotor being supported in said fluid bearing,
motor means attached to said inner case for rotatably driving said rotor about a spin axis,
an outer case,
said inner case being rotatably mounted on said outer case,
means for rotatably driving said inner case relative to said outer case about said rotor spin axis at a slow speed as compared with rotor rotation,
means fixedly mounted on said outer case for torquing said rotor,
pickoff means mounted on said inner case for sensing relative motion between said rotor and said inner case about a pair of mutually orthogonal axes intersecting and normal to said rotor spin axis, and
resolver means connected to said pickoff means for resolving the output of said pickoff means into signals indicative of relative motion between said outer case and said rotor about said pair of mutually orthogonal axes normal to said spin axis.

6. The device as recited in claim 5 wherein said inner case completely surround said rotor to form a fluid tight compartment therefor.

7. In a case rotated gyroscope,
an inner case,
a rotor mounted for three degrees of freedom relative to said inner case,
said rotor having a cylindrical torquer sleeve,
a fluid bearing formed between opposing surfaces of said rotor and said inner case,
said rotor being supported on said fluid bearing,
motor means attached to said inner case for rotatably driving said rotor about a spin axis,
an outer case,
said inner case being rotatably mounted on said outer case,
means for rotatably driving said inner case relative to said outer case about said rotor spin axis at a slow speed as compared with rotor rotation,
means fixedly mounted on said outer case for torquing said rotor, said torquing means including a torquing coil and a core portion positioned on opposite sides of said torquer sleeve,
said inner case having a portion thereof running along the walls of said torquer sleeve between said sleeve and said torquing coil and core portion to form a septum therebetween,
pickoff means mounted on said inner case for sensing relative motion between said rotor and said inner case about a pair of mutually orthogonal axes intersecting and normal to said rotor spin axis, and
resolver means connected to said pickoff means for resolving the output of said pickoff means into signals indicative of relative motion between said outer case and said rotor about said mutually orthogonal axes normal to said spin axis.

8. The device as recited in claim 7 wherein said resolver means includes input coil means mounted on said inner case connected to said pickoff means and output coil means mounted on said outer case in close proximity to said input coil means.

References Cited by the Examiner
UNITED STATES PATENTS

| | | | |
|---|---|---|---|
| 2,852,943 | 9/58 | Sedgfield | 74—5.7 |
| 2,940,318 | 6/60 | Adams et al. | 74—5 |
| 2,981,113 | 4/61 | Erdley | 74—5.4 |
| 3,025,708 | 3/62 | Slater et al. | 74—5.46 |

BROUGHTON G. DURHAM, *Primary Examiner.*

ARTHUR M. HORTON, *Examiner.*